(12) United States Patent
Mikami

(10) Patent No.: US 8,547,198 B2
(45) Date of Patent: Oct. 1, 2013

(54) SEMICONDUCTOR CERAMIC COMPOSITION FOR NTC THERMISTORS AND NTC THERMISTOR

(75) Inventor: Michiru Mikami, Kyoto-fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/541,034

(22) Filed: Jul. 3, 2012

(65) Prior Publication Data

US 2012/0268234 A1    Oct. 25, 2012

Related U.S. Application Data

(63) Continuation of application No. PCT/JP2010/073682, filed on Dec. 28, 2010.

(30) Foreign Application Priority Data

Jan. 12, 2010    (JP) .................................. 2010-003890

(51) Int. Cl.
    *H01C 7/10*    (2006.01)
(52) U.S. Cl.
    USPC ...................................... 338/22 R; 338/22 SD
(58) Field of Classification Search
    USPC ............................................ 338/22 R, 22 SD
    See application file for complete search history.

(56) References Cited

U.S. PATENT DOCUMENTS

| | | | |
|---|---|---|---|
| 5,084,426 A * | 1/1992 | Iwaya et al. | ................... 501/135 |
| 5,246,628 A * | 9/1993 | Jung et al. | ................... 252/519.5 |
| 7,548,149 B2 | 6/2009 | Miura et al. | |
| 7,948,354 B2 | 5/2011 | Miura et al. | |

FOREIGN PATENT DOCUMENTS

| | | |
|---|---|---|
| CN | 101116154A A | 1/2008 |
| EP | 1 848 010 A1 | 10/2007 |
| JP | 03-214703 A | 9/1991 |
| JP | 04-285047 A | 10/1992 |
| JP | 05-041304 A | 2/1993 |
| JP | 05-261437 A | 10/1993 |
| JP | 06-263518 A | 9/1994 |
| JP | 09-162013 A | 6/1997 |
| JP | 2000-086336 A | 3/2000 |

(Continued)

OTHER PUBLICATIONS

Written Opinion of the International Searching Authority, mailed Mar. 15, 2011.

(Continued)

*Primary Examiner* — Kyung Lee
(74) *Attorney, Agent, or Firm* — Dickstein Shapiro LLP

(57) ABSTRACT

Disclosed is a semiconductor ceramic composition for NTC thermistors, which has low dependency on firing temperatures, reduced variations in the resistance values after a resistance-adjusting operation, and reduced changes in resistance in high-temperature environments. The semiconductor ceramic composition contains Mn, Ni and Fe, wherein the molar ratios of Mn and Ni are in ranges of 70 to 80 mol % and 20 to 30 mol %, respectively, relative to the total content (100 mol %) of Mn and Ni, and the Fe content is in a range of 15 parts by mole to 25 parts by mole, both inclusive, relative to the total molar amount (100 parts by mole) of Mn and Ni. Preferably, Co is additionally present in an amount of 2 parts by mole to 40 parts by mole, both inclusive, relative to the total molar amount (100 parts by mole) of Mn and Ni.

21 Claims, 1 Drawing Sheet

(56) References Cited

FOREIGN PATENT DOCUMENTS

| | | |
|---|---|---|
| JP | 2001-261437 A | 9/2001 |
| JP | 2005-150289 A | 6/2005 |
| JP | 2009-188179 A | 8/2009 |
| WO | WO-2006085507 A1 | 8/2006 |

OTHER PUBLICATIONS

State Intellectual Property Office of People's Republic of China, First Office Action, Issuing date Jun. 20, 2013. (English and Chinese language).

\* cited by examiner

SEMICONDUCTOR CERAMIC COMPOSITION FOR NTC THERMISTORS AND NTC THERMISTOR

This is a continuation of application Serial No. PCT/JP2010/073682, filed Dec. 28, 2010, the entire contents of which is incorporated herein by reference.

TECHNICAL FIELD

This invention relates to a semiconductor ceramic composition for NTC thermistors and an NTC thermistor, and particularly relates to a semiconductor ceramic composition for NTC thermistors containing Mn, Ni, and Fe and an NTC thermistor constructed using it.

BACKGROUND ART

NTC thermistors are known to be useful for applications such as temperature compensation or temperature detection. Furthermore, the demand for NTC thermistors with reduced deviations in characteristics has recently been rising as electronic devices have become smaller and circuits have become more complicated. More specifically, for example, the deviation in resistance value was previously acceptable when it was within ±5%, but now is required to be as small as within ±1% to ±0.5%.

Regarding the deviation reduction mentioned above, there are more-detailed requirements: NTC thermistors should be unlikely to change characteristics over time when they are left at high temperatures around 125° C. and, furthermore, they should also be unlikely to change when they are left at further elevated temperatures around 175° C. so that they can be used in automotive applications; and their characteristics should not be significantly affected by unavoidable variations in conditions that may be encountered during the manufacturing process, or in other words, their manufacturing yield should be satisfactorily high.

In particular, the latter affected characteristics that may occur during the manufacturing process as a result of variations in conditions is described in more detail as follows. The characteristics of NTC thermistors are often affected by variations in conditions that occur during the manufacturing process, in particular, variations in the firing temperature used in the firing process. For example, the conditions of the firing furnace, the input (charge quantity) of the unfired chips (i.e., the precursors of the NTC thermistors) into the furnace and their arrangement in the furnace, the weather conditions on the day the firing furnace is operated, and other factors undesirably cause variations among the unfired chips in the firing temperature to which each unfired chip is exposed. This results in the situation where the individual NTC thermistors differ from each other in firing history. The resistance value and other characteristics may thus vary among the resulting NTC thermistors.

As can be seen from this, the characteristics of NTC thermistors generally have relatively high "dependency on firing temperatures."

On the other hand, there are some measures that can be taken after the firing process to address the variations in characteristics among NTC thermistors. An example is the resistance adjustment method, in which a heat treatment at a temperature of 250 to 500° C. is carried out after the formation of the external electrodes so that the intended resistance value should be obtained. However, the rate of change in resistance value brought about by this heat treatment varies depending on the constitution and shape of the semiconductor ceramic composition used to construct the NTC thermistors. It is thus difficult in some cases to achieve the resistance value that matches the desired value by heat treatment.

By way of an example of the semiconductor ceramic compositions for NTC thermistors interesting for this invention, Japanese Unexamined Patent Application Publication No. 6-263518 (Patent Document 1) discloses a ceramic composition for NTC thermistors represented by the general formula $Fe_zNi_xMn_{3-x-z}O_4$ (x=0.84 to 1 and 0<z<1.6). Patent Document 1 states that this ceramic composition is characterized by a small rate of change in resistance at elevated temperatures.

However, the ceramic composition described in Patent Document 1 has proved to have high dependency on firing temperatures.

On the other hand, Japanese Unexamined Patent Application Publication No. 2005-150289 (Patent Document 2) discloses a composition for thermistors containing a manganese oxide, a nickel oxide, an iron oxide, and a zirconium oxide, wherein the manganese oxide and the nickel oxide as main ingredients are contained in amounts of a mol % based on Mn (where a is in a range of 45 to 95, excluding 45 and 95) and (100-a) mol % based on Ni, and the iron oxide and the zirconium oxide are contained in amounts of 0 to 55% by weight based on $Fe_2O_3$ (excluding 0% by weight and 55% by weight) and 0 to 15% by weight based on $ZrO_2$ (excluding 0% by weight and 15% by weight) relative to 100% by weight of the main ingredients. Patent Document 2 states that this composition can be used at high temperatures and high humidity levels with small rates of change in resistance and, furthermore, that it satisfies various requirements in circuit design because it allows a wide adjustable range of the B parameter on the low-temperature side (25 to −40° C.).

However, the composition for thermistors described in Patent Document 2 has proved to be sensitive to changes in the manufacturing conditions, thereby giving a low yield, and to be not fully reliable especially when it is left at an elevated temperature.

A more detailed explanation can be found in Examples section of Patent Document 2, which discloses a constitution containing main ingredients consisting of Mn: 80.0 mol % and Ni: 20.0 mol % and $Fe_2O_3$ in 10.0% by weight relative to 100% by weight of the main ingredients (in other words, a constitution containing Fe in 9.51 parts by mole relative to 100 parts by mole of the main ingredients) as Sample 21 falling within the scope of the invention and also discloses a constitution containing main ingredients consisting of Mn: 80.0 mol % and Ni: 20.0 mol % and $Fe_2O_3$ in 30.0% by weight relative to 100% by weight of the main ingredients (in other words, a constitution containing Fe in 28.54 parts by mole relative to 100 parts by mole of the main ingredients) as Sample 22 falling within the scope of the invention.

When placed in an ambient temperature environment of 175° C., however, the constitution of Sample 21 described above undesirably experiences a great change in resistance value; it has proved to be lacking in the reliability in high-temperature environments.

On the other hand, the constitution of Sample 22 described above has proved to be disadvantageous in the following way. With this composition, adjusting the resistance value of the NTC thermistors after the firing process in the way described above, or more specifically by heating them at a temperature of 250 to 500° C., requires a relatively high temperature, often leading to great variations in characteristics after the resistance-adjusting operation, and this makes it difficult to achieve consistent characteristics. In this way, this composition may cause the yield to be reduced.

Patent Document Citation List

Patent Document 1: Japanese Unexamined Patent Application Publication No. 6-263518
Patent Document 2: Japanese Unexamined Patent Application Publication No. 2005-150289

SUMMARY OF INVENTION

Technical Problem

An object of this invention is, therefore, to provide a semiconductor ceramic composition for NTC thermistors advantageous in the following ways: its dependency on firing temperatures is low and it serves to reduce the variations in the resistance values after a resistance-adjusting operation, and thus the manufacturing yield can be improved; it serves to reduce the changes in resistance in high-temperature environments.

Another object of this invention is to provide an NTC thermistor constructed using the semiconductor ceramic composition.

Solution to Problem

The semiconductor ceramic composition for NTC thermistors according to this invention contains Mn, Ni, and Fe. To solve the technical problems mentioned above, however, it is characterized in that the molar ratios of Mn and Ni are in ranges of 70 to 80 mol % and 20 to 30 mol %, respectively, relative to the total content (100 mol %) of Mn and Ni, and that the Fe content is in a range of 15 parts by mole to 25 parts by mole, both inclusive, relative to the total molar amount (100 parts by mole) of Mn and Ni.

Preferably, the semiconductor ceramic composition for NTC thermistors described above additionally contains Co in an amount of 2 parts by mole to 40 parts by mole, both inclusive, relative to the total molar amount (100 parts by mole) of Mn and Ni.

This invention can also be directed to NTC thermistors constructed using the semiconductor ceramic composition described above. The NTC thermistor according to this invention has a component main body made of the above-described semiconductor ceramic composition and first and second electrodes facing each other with at least a portion of the component main body therebetween.

ADVANTAGEOUS EFFECTS OF INVENTION

The first advantageous effect of this invention is that a semiconductor ceramic composition for NTC thermistors can be obtained having low dependency on firing temperatures. This means that the strict control of temperature conditions during the firing process is no longer needed, and thus, the process control procedure for the manufacturing process can be simplified and the yield can also be improved. As a result, the cost of the manufacturing of NTC thermistors can be brought down.

Another advantageous effect of this invention is that a semiconductor ceramic composition for NTC thermistors can be obtained with reduced changes in resistance in high-temperature environments around 125° C. or 175° C. or, in other words, having high consistency in characteristics.

Furthermore, the semiconductor ceramic composition for NTC thermistors according to this invention can easily change its resistance value at a relatively low temperature and in a relatively short period of time when it is subjected to a heat treatment in the temperature range that will be applied in the resistance-adjusting operation after the firing process, such as 250 to 500° C., despite the reduced changes in resistance at temperatures around 125° C. or 175° C. mentioned above.

Incidentally, resistance adjustment requiring a relatively high temperature or a relatively long period of time often causes great variations in the resistance after the heat treatment operation for resistance adjustment following the firing process. The semiconductor ceramic composition according to this invention, however, can easily change its resistance value at a relatively low temperature and in a relatively short period of time as mentioned above, and thus serves to reduce the variations in the resistance after the heat treatment operation for resistance adjustment following the firing process. This also contributes to an improved yield and thereby makes it possible to bring down the cost of NTC thermistors.

The semiconductor ceramic composition for NTC thermistors according to this invention can serve to improve the fracture strength of the NTC thermistors when it additionally contains Co in an amount of 2 parts by mole to 40 parts by mole, both inclusive, relative to the total molar amount (100 parts by mole) of Mn and Ni.

DESCRIPTION OF EMBODIMENTS

Figure 1:
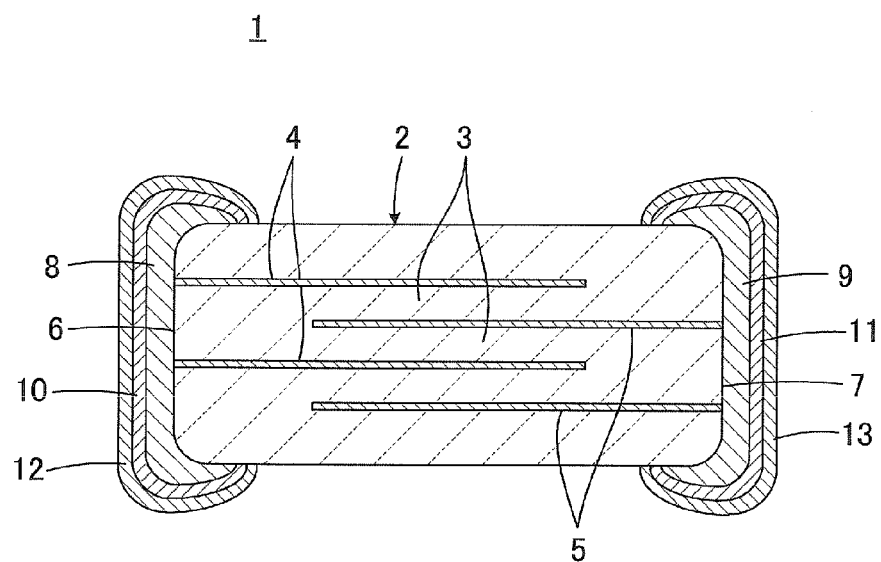
FIG. 1 is a cross-sectional diagram that schematically illustrates a multilayer NTC thermistor 1 constructed using the semiconductor ceramic composition according to this invention.
Figure 2:
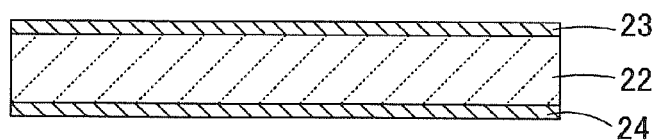
FIG. 2 is a cross-sectional diagram that schematically illustrates a single-plate NTC thermistor 21 constructed using the semiconductor ceramic composition according to this invention.

The semiconductor ceramic composition according to this invention is used in, for example, the multilayer NTC thermistor 1 illustrated in FIG. 1 or the single-plate NTC thermistor 21 illustrated in FIG. 2. First, the structure of the multilayer NTC thermistor 1 and that of the single-plate NTC thermistor 21 are described with reference to FIG. 1 and FIG. 2.

With reference to FIG. 1, the multilayer NTC thermistor 1 has a component main body 2 having a substantially rectangular parallelepiped shape. The component main body 2 has a multilayer structure consisting of multiple layers 3 and contain internal electrodes 4 and 5 formed between some selected layers 3. The internal electrodes 4 and 5 are grouped into first internal electrodes 4 and second internal electrodes 5, and the first internal electrodes 4 and the second internal electrodes 5 are alternately arranged with respect to the stacking direction. In this way, a structure is provided in which the first and second internal electrodes 4 and 5 face each other with a portion of the component main body 2 therebetween.

One end face 6 of the component main body 2 has a first external electrode 8 formed thereon, and the other end face 7 of the component main body 2 has a second external electrode 9 formed thereon. These external electrodes 8 and 9 are formed by, for example, printing and firing an electroconductive paste containing Ag as a conductor. The above-described first internal electrodes 4 extend to one end face 6 of the component main body 2 and are electrically connected there to the first external electrode 8, and the second internal electrodes 5 extend to the other end face 7 of the component main body 2 and are electrically connected there to the second external electrode 9.

If necessary, the first and second external electrodes 8 and 9 may be covered with first plating coatings 10 and 11, respectively, made of Ni or of a similar material, and then with second plating coatings 12 and 13, respectively, made of Sn or of a similar material.

Next, with reference to FIG. 2, the single-plate NTC thermistor 21 has a component main body 22 having a substantially rectangular plate shape and also has first and second electrodes 23 and 24 formed to face each other with this component main body 22 therebetween.

In such NTC thermistors 1 and 21, the component main bodies 2 and 22 are constructed using the semiconductor ceramic composition according to this invention.

The semiconductor ceramic composition for NTC thermistors according to this invention, as described above, contains Mn, Ni, and Fe, wherein the molar ratios of Mn and Ni are 70 to 80 mol % and 20 to 30 mol %, respectively, relative to the total content (100 mol %) of Mn and Ni, and wherein the Fe content is 15 parts by mole to 25 parts by mole, both inclusive, relative to the total molar amount (100 parts by mole) of Mn and Ni.

A semiconductor ceramic composition having such a constitution, as described above, has low dependency on firing temperatures, serves to reduce the variations in the resistance values after a resistance-adjusting operation, and thereby contributes to an improved manufacturing yield of the NTC thermistors 1 and 21. Furthermore, it serves to reduce the changes in resistance of the NTC thermistors 1 and 21 in high-temperature environments.

In addition, the semiconductor ceramic composition as the material of the component main bodies 2 and 22 can serve to improve the fracture strength of the NTC thermistors 1 and 21 when it additionally contains Co in an amount of 2 parts by mole to 40 parts by mole, both inclusive, relative to the total molar amount (100 parts by mole) of Mn and Ni.

Next, a typical method for manufacturing the multilayer NTC thermistor 1 illustrated in FIG. 1 is described.

First, as ceramic raw materials, $Mn_3O_4$, $Fe_2O_3$, and NiO powders and a $Co_3O_4$ powder, if necessary, are prepared, and specified amounts of these powders are weighed. Then, the weighed materials are put into a ball mill and fully wet-ground with a grinding medium composed of zirconia or of a similar material. After that, the obtained particles are calcined at a specified temperature to produce a ceramic powder.

Specified amounts of an organic binder and water are added to the ceramic powder, and the ingredients are wet-mixed to form a slurry. After that, the slurry is shaped by the doctor blade method or by a similar method into ceramic green sheets that serve as the individual layers 3 of the component main body 2.

Then, an electroconductive paste mainly composed of Ag—Pd or of a similar material is applied to each ceramic green sheet by screen printing to form an electroconductive paste film that serves as an internal electrode 4 or 5.

Some of the ceramic green sheets having the electroconductive paste film formed thereon are stacked, and ceramic green sheets with no electroconductive paste film are placed on the outermost layers so that the preexisting stack is sandwiched. These ceramic green sheets are crimped, and thereby a multilayer-structured raw laminate is produced that serves as the component main body 2.

Then, if necessary, this raw laminate is cut to specified dimensions. After that, the raw laminate is placed in a cell made of zirconia or of a similar material, heated at a temperature of, for example, 300 to 500° C. so that binder should be removed, and subsequently fired at a specified temperature, for example, a temperature in a range of 1100 to 1200° C. The component main body 2 is thus obtained.

Subsequently, an electroconductive paste mainly composed of Ag or of a similar material is applied to both end faces 6 and 7 of the component main body 2 and fired to form external electrodes 8 and 9. After that, if necessary, the component main body 2 having the external electrodes 8 and 9 formed thereon is heated at a temperature of, for example, 250 to 500° C. for the adjustment of the resistance thereof. Here, the heating temperature and time vary depending on the desired amount of change in resistance.

Thereafter the surfaces of the external electrodes 8 and 9 are electrolytically plated and thereby covered with first plating coatings 10 and 11 made of Ni or of a similar material and then with second plating coatings 12 and 13 made of Sn or of a similar material.

In this way, the multilayer NTC thermistor 1 illustrated in FIG. 1 is completed.

Incidentally, the external electrodes 8 and 9 may be formed by sputtering, vacuum deposition, or any other suitable thin-film formation technique as long as good adhesion to the component main body 2 is ensured.

Moreover, although the ceramic raw materials used above are oxides such as $Mn_3O_4$, $Fe_2O_3$, $Co_3O_4$, and NiO, a carbonate, a hydroxide, and other forms may be used instead for each of Mn, Fe, Co, and Ni.

Next, a typical method for manufacturing the single-plate NTC thermistor 21 illustrated FIG. 2 is described.

First, a ceramic powder is prepared as with the multilayer NTC thermistor 1, and then formed into a slurry. After that, the slurry is shaped by the doctor blade method or by a similar method into ceramic green sheets. Then, these ceramic green sheets are stacked and crimped so that the desired thickness can be obtained. A ceramic green compact is thus obtained that serves as the component main body 22.

Then, an electroconductive paste mainly composed of Ag—Pd or of a similar material is applied to both sides of the ceramic green compact by screen printing to form an electroconductive paste film that serves as an electrode 23 or 24.

If necessary, the ceramic green compact having the electroconductive paste films formed thereon is cut to specified dimensions. After that, the ceramic green compact is placed in a cell made of zirconia or of a similar material, subjected to a treatment for removing binder, and subsequently fired at a specified temperature, for example, a temperature in a range of 1100 to 1200° C. Thereafter, if necessary, the ceramic compact is heated at a temperature of, for example, 250 to 500° C. for a specified period of time for the adjustment of the resistance thereof.

In this way, the single-plate NTC thermistor 21 illustrated in FIG. 2 is completed.

In the case of the single-plate NTC thermistor 21, resistance adjustment by cutting away a portion of it or some other trimming approach is possible. In the case of the multilayer NTC thermistor 1, however, resistance adjustment by cutting away a portion of it or some other trimming approach is virtually impossible. This means that the ease of resistance adjustment by heat treatment after the firing process is an advantage of particular significance for the multilayer NTC thermistor 1.

Next, some experiments conducted to determine the scope of this invention are described. In these experiments, sets of single-plate NTC thermistors like the one illustrated in FIG. 2 were produced as samples.

EXPERIMENT 1

First, as ceramic raw materials, $Mn_3O_4$, $Fe_2O_3$, and NiO powders were prepared, and these powders were weighed to make each constitution specified in Table 1. In Table 1, the columns "Mn" and "Ni" list the molar percentages of $Mn_3O_4$ and NiO, respectively, relative to their total molar amount, with the calculations based on Mn and Ni, and the column "Fe/(Mn+Ni)" lists the $Fe_2O_3$ content, in parts by mole based on Fe, relative to the total molar amount (100 parts by mole) of $Mn_3O_4$ and NiO based on Mn and Ni.

The weighed materials were put into a ball mill and fully wet-ground with a grinding material composed of zirconia. After that, the obtained particles were calcined at a temperature of 730° C. for 2 hours to produce a ceramic powder.

Next, specified amounts of an organic binder and water were added to the ceramic powder, and the ingredients were wet-mixed to turn to slurry. After that, the slurry was shaped by the doctor blade method into ceramic green sheets.

Then, some of the ceramic green sheets were stacked and crimped so that a thickness of about 0.70 mm could be obtained, and thereby a ceramic green compact was obtained.

An electroconductive paste mainly composed of Ag—Pd was applied to both sides of the ceramic green compact by screen printing to form electroconductive paste films.

Then, the ceramic green compact having the electroconductive paste films formed thereon was cut into pieces each having plan dimensions of 2.0 mm×2.0 mm. After that, the cut-out pieces were placed in a zirconia cell, maintained at a temperature of 350° C. for 8 hours so that binder should be removed, and subsequently fired at a specified temperature. In this way, single-plate NTC thermistor samples were obtained.

The dependency on firing temperatures was evaluated. For this purpose, 1100° C. and 1150° C. were used as the temperature for the firing process described above, and the room-temperature (25° C.) resistance values of NTC thermistors obtained with the individual firing temperatures, i.e., the resistance value after firing at 1100° C., $R_{25}$ (1100° C.), and the resistance value after firing at 1150° C., $R_{25}$ (1150° C.), were measured by the four-terminal method. Then, the rate of change in resistance value R with a change in firing temperature T [° C.], $\Delta R/\Delta T$ [%/° C.], was calculated on the basis of the following formula:

$$\Delta R/\Delta T = [\{R_{25}(1150° C.) - R_{25}(1100° C.)\}/R_{25}(1100° C.)/(1150-1100)] \times 100.$$

The results are shown under the column "$\Delta R/\Delta T$ (1100 to 1150° C.)" in Table 1.

Furthermore, an NTC thermistor obtained with a firing temperature of 1125° C. was allowed to stand at temperatures of 125° C. and 175° C. for 100 hours each, and the rate of change in resistance during each standing period was determined. More specifically, the four-terminal method was used to determine the room-temperature (25° C.) resistance value of the NTC thermistor before the high-temperature standing test, $R_{25}$ (0 hour), and the room-temperature (25° C.) resistance values after standing for 100 hours at temperatures of 125° C. and 175° C., $R_{25}$ (100 hours), and then the rates of change in resistance, $\Delta R/R$ [%], were calculated on the basis of the following formula:

$$\Delta R/R = \{R_{25}(100 \text{ hours}) - R_{25}(0 \text{ hour})\}/R_{25}(0 \text{ hour}).$$

The results after standing at 125° C. are shown under the column "$\Delta R/R$ (125° C.)" in Table 1, and those after standing at 175° C. under the column "$\Delta R/R$ (175° C.)".

Furthermore, sets of NTC thermistors obtained with a firing temperature of 1125° C. were evaluated for the variations in the resistance after a resistance-adjusting operation. More specifically, each sample was given its own heating temperature chosen from a range of 250 to 500° C. and at which its resistance value changed (increased) by 5% as measured by the four-terminal method, the sample was then maintained at that temperature for 2 hours, and the variation in the resistance after the heat treatment, R3CV [%], was calculated on the basis of the following formula:

$$R3CV = \text{Standard deviation/Mean} \times 300.$$

The results are shown under the column "R3CV after resistance adjustment" in Table 1.

TABLE 1

| Sample No. | Mn mol % | Ni mol % | Fe/(Mn + Ni) parts by mole | $\Delta R/\Delta T$ (1100 to 1500° C.) %/° C. | $\Delta R/R$ (125° C.) % | $\Delta R/R$ (175° C.) % | R3CV after resistance adjustment % |
|---|---|---|---|---|---|---|---|
| 1* | 82.7 | 17.3 | 15.4 | 0.42 | 1.01 | 3.15 | 3.02 |
| 2* | 80.0 | 20.0 | 14.4 | 0.45 | 0.92 | 3.05 | 3.56 |
| 3 | 80.0 | 20.0 | 15.0 | 0.35 | 0.88 | 2.94 | 3.23 |
| 4 | 80.0 | 20.0 | 17.8 | 0.28 | 0.74 | 2.46 | 2.64 |
| 5 | 80.0 | 20.0 | 20.0 | 0.44 | 0.72 | 1.54 | 5.65 |
| 6 | 80.0 | 20.0 | 22.4 | 0.43 | 0.59 | 1.35 | 6.28 |
| 7 | 80.0 | 20.0 | 25.0 | 0.34 | 0.51 | 1.32 | 10.68 |
| 8* | 80.0 | 20.0 | 27.6 | 0.24 | 0.44 | 1.46 | 46.05 |
| 9* | 80.0 | 20.0 | 30.1 | 0.14 | 0.36 | 1.22 | 83.56 |
| 10 | 80.0 | 20.0 | 15.4 | 0.35 | 0.88 | 2.59 | 2.65 |
| 11 | 78.8 | 21.2 | 15.4 | 0.55 | 0.85 | 2.45 | 2.95 |
| 12 | 76.9 | 23.1 | 15.4 | 0.35 | 0.82 | 2.16 | 2.88 |
| 13 | 75.0 | 25.0 | 15.4 | 0.38 | 0.66 | 1.64 | 3.02 |
| 14 | 70.6 | 29.4 | 15.4 | 0.67 | 0.77 | 1.88 | 3.05 |
| 15 | 70.0 | 30.0 | 15.4 | 0.88 | 0.62 | 1.27 | 3.56 |
| 16* | 68.6 | 31.4 | 15.4 | 1.11 | 0.23 | 1.14 | 2.94 |

In Table 1, the sample numbers denoted with * represent samples outside the scope of this invention. The requirements that the NTC thermistors should meet to fall within the scope of this invention were as follows:

"$\Delta R/\Delta T$ (1100 to 1150° C.)" should be equal to or less than 1.0%/° C.;

"$\Delta R/R$ (125° C.)" should be equal to or less than 1.0%;

"$\Delta R/R$ (175° C.)" should be equal to or less than 3.0%; and

"R3CV after resistance adjustment" should be equal to or less than 15.0%.

For Sample 1, which is outside the scope of this invention, "Mn" is more than 80 mol % ("Ni" is less than 20 mol %).

With this sample, "ΔR/R (125%)" was more than 1.0%, and "ΔR/R (175° C.)" was more than 3.0%; this sample was found to greatly change resistance in high-temperature environments and shown to be inferior in reliability. This appears to be because in the sintered compact made from the semiconductor ceramic composition, some of the cubic crystals had been transformed into tetragonal crystals.

For Sample 2, which is outside the scope of this invention, "Fe/(Mn+Ni)" is less than 15 parts by mole. With this sample, "ΔR/R (175° C.)" was more than 3.0%; this sample was found to greatly change resistance in high-temperature environments and shown to be inferior in reliability.

For Samples 8 and 9, which are outside the scope of this invention, "Fe/(Mn+Ni)" is more than 25 parts by mole. With these samples, "R3CV after resistance adjustment" was more than 15.0%; these samples exhibited great variations in the resistance after a resistance-adjusting operation. This is because the temperature required to adjust the resistance was high.

For Sample 16, which is outside the scope of this invention, "Ni" is more than 30 mol % ("Mn" is less than 70 mol %). With this sample "ΔR/ΔT (1100 to 1150° C.)" was more than 1.0%; it was found to have high dependency on firing temperatures. This appears to be because a NiO rock-salt phase was formed in the sintered compact made from the semiconductor ceramic composition.

On the other hand, Samples 3 to 7 and 10 to 15, which fall within the scope of this invention, were found to have low dependency on firing temperatures as indicated by the "ΔR/ΔT (1100 to 1150° C.)" values less than 1.0%/° C., and to be unlikely to change resistance in high-temperature environments and thus reliable as indicated by the "ΔR/R (125° C.)" values less than 1.0% and the "ΔR/R (175° C.)" values less than 3.0%, and exhibited small variations in the resistance after a resistance-adjusting operation as indicated by the "R3CV after resistance adjustment" values less than 15.0%.

EXPERIMENT 2

Experiment 2 examined the enhancement effect of the presence of Co on fracture strength.

First, as ceramic raw materials, $Mn_3O_4$, $Fe_2O_3$, and NiO powders as well as a $Co_3O_4$ powder were prepared, and these powders were weighed to make each constitution specified in Table 2. In Table 2, the columns "Mn", "Ni", and "Fe/(Mn+Ni)" individually list the values in the same way as in Table 1, and the column "Co/(Mn+Ni)" lists the $Co_3O_4$ content, in parts by mole based on Co, relative to the total molar amount (100 parts by mole) of $Mn_3O_4$ and NiO based on Mn and Ni.

After that, ceramic green sheets were produced by operations similar to those used in Experiment 1. Then, some of the obtained ceramic green sheets were stacked and crimped so that a thickness of about 1.00 mm could be obtained, and thereby a ceramic green compact was obtained. The ceramic green compact was cut to 3.0 mm in width and 50 mm in length. After that, the cut-out piece was placed in a zirconia cell, maintained at a temperature of 350° C. for 8 hours so that the binder should be removed, and subsequently fired at a temperature of 1125° C. In this way, strip-shaped NTC thermistor samples were obtained.

The obtained NTC thermistor samples were individually evaluated for fracture strength. For the evaluation, a three-point bending test was performed using "AUTOGRAPH (AG-I)", manufactured by Shimadzu Corporation, under the following test conditions to measure the maximum load (P) that the test specimen could withstand before breaking. The obtained maximum load (P) and the measured dimensions of the test specimen (width: w, thickness: t) were put into Formula (1) below, and thereby the fracture strength was calculated.

Test Conditions
Support span (L): 30 mm
Crosshead speed: 0.5 mm/min $$(\text{Fracture strength}) = 3 \times P \times L / (2 \times w \times t^2) \quad \text{Formula (1)}$$

The results are shown in Table 2.

TABLE 2

| Sample No. | Mn mol % | Ni mol % | Fe/(Mn + Ni) parts by mole | Co/(Mn + Ni) parts by mole | Fracture strength Mpa |
|---|---|---|---|---|---|
| 21* | 78.3 | 21.7 | 20.0 | 0.0 | 127.9 |
| 22* | 78.3 | 21.7 | 20.0 | 0.5 | 124.5 |
| 23* | 78.3 | 21.7 | 20.0 | 1.0 | 110.0 |
| 24 | 78.3 | 21.7 | 20.0 | 2.0 | 131.5 |
| 25 | 78.3 | 21.7 | 20.0 | 4.0 | 143.5 |
| 26 | 78.3 | 21.7 | 20.0 | 8.0 | 160.0 |
| 27 | 78.3 | 21.7 | 20.0 | 20.0 | 158.0 |
| 28 | 78.3 | 21.7 | 20.0 | 40.0 | 153.0 |
| 28* | 78.3 | 21.7 | 20.0 | 80.0 | 123.4 |
| 29* | 78.3 | 21.7 | 20.0 | 120.0 | 82.1 |

In Table 2, the sample numbers denoted with * represent samples that contained Co in an amount outside the preferred range. The definition of the preferred range of Co content was based on the samples that showed better fracture strength than Sample 21, which contained no Co.

For Samples 22 and 23, "Co/(Mn+Ni)" is less than 2.0 parts by mole. The fracture strength of these samples was similar to or worse than that of Sample 21, for which "Co/(Mn+Ni)" is 0 part by mole; the addition of Co had no effect on these samples.

On the other hand, for Samples 28 and 29, "Co/(Mn+Ni)" is more than 40.0 parts by mole. The fracture strength of these samples was also similar to or worse than that of Sample 21, for which "Co/(Mn+Ni)" was 0 part by mole. Indeed, the addition of Co resulted in a reduced fracture strength. This appears to be because a CoO rock-salt phase was formed in the sintered compact made from the semiconductor ceramic composition.

| Reference Signs List | |
|---|---|
| 1, 21 | NTC thermistor |
| 2, 22 | Component main body |
| 4, 5 | Internal electrode |
| 23, 24 | Electrode |

The invention claimed is:

1. A semiconductor ceramic composition for NTC thermistors, consisting essentially of Mn, Ni, and Fe, wherein
    the molar amounts of Mn and Ni are in ranges of 70 to 80 mol % and 20 to 30 mol %, respectively, relative to the total content (100 mol %) of Mn and Ni, and
    the Fe content is in a range of 15 parts by mole to 25 parts by mole, both inclusive, relative to the total molar amount (100 parts by mole) of Mn and Ni.

2. The semiconductor ceramic composition for NTC thermistors according to claim 1, additionally containing Co in an amount of 2 parts by mole to 40 parts by mole, both inclusive, relative to the total molar amount (100 parts by mole) of Mn and Ni.

3. The semiconductor ceramic composition for NTC thermistors according to claim 2, in which the Co is in an amount of at least 4 parts by mole relative to the total molar amount (100 parts by mole) of Mn and Ni.

4. The semiconductor ceramic composition for NTC thermistors according to claim 3, in which the Mn is in an amount of 70 to 75 parts by mole relative to the total molar amount (100 parts by mole) of Mn and Ni.

5. The semiconductor ceramic composition for NTC thermistors according to claim 4, in which the Fe is in an amount of 15 to 20 parts by mole relative to the total molar amount (100 parts by mole) of Mn and Ni.

6. The semiconductor ceramic composition for NTC thermistors according to claim 1, in which the Mn is in an amount of 70 to 75 parts by mole relative to the total molar amount (100 parts by mole) of Mn and Ni.

7. The semiconductor ceramic composition for NTC thermistors according to claim 6, in which the Fe is in an amount of 15 to 20 parts by mole relative to the total molar amount (100 parts by mole) of Mn and Ni.

8. The semiconductor ceramic composition for NTC thermistors according to claim 7, additionally containing Co in an amount of 4 parts by mole to 40 parts by mole relative to the total molar amount (100 parts by mole) of Mn and Ni.

9. The semiconductor ceramic composition for NTC thermistors according to claim 1, in which the Fe is in an amount of 15 to 20 parts by mole relative to the total molar amount (100 parts by mole) of Mn and Ni.

10. The semiconductor ceramic composition for NTC thermistors according to claim 9, additionally containing Co in an amount of at least 4 parts by mole relative to the total molar amount (100 parts by mole) of Mn and Ni.

11. An NTC thermistor comprising a component main body of the semiconductor ceramic composition according to claim 10, and first and second electrodes facing each other with at least a portion of the component main body therebetween.

12. An NTC thermistor comprising a component main body of the semiconductor ceramic composition according to claim 9, and first and second electrodes facing each other with at least a portion of the component main body therebetween.

13. An NTC thermistor comprising a component main body of the semiconductor ceramic composition according to claim 8, and first and second electrodes facing each other with at least a portion of the component main body therebetween.

14. An NTC thermistor comprising a component main body of the semiconductor ceramic composition according to claim 7, and first and second electrodes facing each other with at least a portion of the component main body therebetween.

15. An NTC thermistor comprising a component main body of the semiconductor ceramic composition according to claim 6, and first and second electrodes facing each other with at least a portion of the component main body therebetween.

16. An NTC thermistor comprising a component main body of the semiconductor ceramic composition according to claim 5, and first and second electrodes facing each other with at least a portion of the component main body therebetween.

17. An NTC thermistor comprising a component main body of the semiconductor ceramic composition according to claim 4, and first and second electrodes facing each other with at least a portion of the component main body therebetween.

18. An NTC thermistor comprising a component main body of the semiconductor ceramic composition according to claim 3, and first and second electrodes facing each other with at least a portion of the component main body therebetween.

19. An NTC thermistor comprising a component main body of the semiconductor ceramic composition according to claim 2, and first and second electrodes facing each other with at least a portion of the component main body therebetween.

20. An NTC thermistor comprising a component main body of the semiconductor ceramic composition according to claim 1, and first and second electrodes facing each other with at least a portion of the component main body therebetween.

21. A semiconductor ceramic composition for NTC thermistors, comprising Mn, Ni, and Fe, wherein
the molar amounts of Mn and Ni are in ranges of 70 to 80 mol % and 20 to 30 mol %, respectively, relative to the total content (100 mol %) of Mn and Ni, and
the Fe content is in a range of 15 parts by mole to 25 parts by mole, both inclusive, relative to the total molar amount (100 parts by mole) of Mn and Ni,
wherein said composition is free of Al and Ti.

* * * * *